United States Patent [19]

Dubner

[11] Patent Number: 4,849,746

[45] Date of Patent: Jul. 18, 1989

[54] DIGITAL VIDEO GENERATOR

[75] Inventor: Robert J. Dubner, Westwood, N.J.

[73] Assignee: Dubner Computer Systems, Inc., Paramus, N.J.

[21] Appl. No.: 848,599

[22] Filed: Apr. 7, 1986

[51] Int. Cl.⁴ .............................................. G09G 1/06
[52] U.S. Cl. .................................. 340/728; 340/724; 340/726
[58] Field of Search ............... 340/726, 728, 744, 747, 340/724, 792, 793; 358/133

[56] References Cited

U.S. PATENT DOCUMENTS

| | | | |
|---|---|---|---|
| 3,192,315 | 6/1965 | Remley | 358/133 |
| 3,611,348 | 10/1971 | Rogers | 340/726 |
| 4,237,457 | 12/1980 | Houldsworth | 340/744 |
| 4,454,506 | 6/1984 | Netravali et al. | 340/728 |
| 4,486,785 | 12/1984 | Lasher et al. | 340/728 |
| 4,532,503 | 7/1985 | Pennebaker | 340/728 |
| 4,720,705 | 1/1988 | Gupta et al. | 340/724 |

OTHER PUBLICATIONS

*Distributed Ray Tracing;* Cook et al.; Computer Graphics, vol. 18, No. 3; Jul. 1984; pp. 137–145.

*Primary Examiner*—John W. Caldwell, Sr.
*Assistant Examiner*—Jeffery A. Brier
*Attorney, Agent, or Firm*—Francis I. Gray

[57] ABSTRACT

A digital video generator provides for smooth scrolling of a video image across a video display device. A digital memory contains data to be displayed. Under control of a computer this data is transferred to a display memory as needed. The data is displayed with a gray scale intensity level for each pixel. Two successive pixels in the direction of movement are read out of the display memory, a current pixel and a next pixel, and are added together in a mixer with a weighting factor determined by the computer according to the scrolling speed selected to provide a weighted pixel. The weighted pixel is converted into analog video data or display. At intervals depending upon the selected scrolling speed the computer reloads the display memory from the digital memory to replace the data which has been displayed and scrolled off the monitor. Initial values for the top of the display field and the weighting factor are computed each display cycle. The result is the appearance of smooth partial pixel movement for each display cycle.

10 Claims, 5 Drawing Sheets

O = WHITE
X = GREY
I = BLACK

DIGITAL VIDEO GENERATOR

BACKGROUND OF THE INVENTION

The present invention relates to digital video generators, and more particularly to a digital video generator for providing smooth scrolling of video images on a video display.

There are many applications where a video image is processed in digital form prior to display. Such applications include character generators in the television industry for special effects and scrolling of credits. More recently this processing also is being applied to teleprompter systems where a speaker reads lines from a television display while text is scrolled across the face of the display.

As an example, taken from the field of teleprompter systems, a person stands or sits in front of a television camera and/or a live audience and looks through a beam splitter. Reflected in the beam splitter is a television monitor upon which is displayed text to be read by that person. As the text is read, it scrolls up off the top of the monitor screen while new text appears at the bottom.

Traditionally, the text image is generated by typing the text on white paper and placing successive pages on a conveyor belt. The conveyor belt brings the pages past the lens of a television camera and appropriate light sources. The resulting television picture is sent to the television monitor, which monitor typically is modified to reverse the image top-to-bottom so that the image is upright when viewed in the beam splitter. The conveyor belt is controlled with a rheostat for speed and a switch for direction, and two people are required to operate the system—one to control the conveyor belt speed, adapting it to the reader's speaking rate, and the other to feed the text pages onto the belt.

There have been some attempts to build computer-based teleprompter systems by combining the features of a word processor with the electronic generation of the scrolled text. These systems suffer from poor character quality and from irregular scrolling.

First, a digital character has unnaturally sharp edges, which is objectionable to the human eye, as opposed to an analog character from a television camera which has gray corners and edges. This problem, known generally as "aliasing", is well understood. The dots, squares or pixels (picture elements) which make up a digital character are either "on" or "off". The classic technique for anti-aliasing is to filter the data in such a way as to simulate the response of a non-discrete system, such as the television camera, which blurs the edges of the character.

Second, current digital systems do not scroll smoothly at arbitrary scrolling speeds. In non-discrete systems the blurring of the character image makes possible the appearance of partial video line movement. However, a digital system, which turns dots either "on" or "off", moves the image a whole line at a time or not at all. This produces a jumpy scrolling motion which is a temporal aliasing problem. This problem exists in the scrolling of any digital video image, not just in teleprompter systems.

What is desired is a digital video generator which provides good character quality and smooth scrolling characteristics.

SUMMARY OF THE INVENTION

Accordingly, the present invention provides a digital video generator for smoothly scrolling a video image across a video display device. A digital memory contains data which is to be displayed as a video image on a display monitor. Under control of a computer the data is transferred from the digital memory, as needed, to a wrap-around display memory in the digital video generator for processing before being displayed on the monitor. For each field or frame, depending upon the desired scroll rate, the computer loads initial values into input registers of the digital video generator, and at intervals depending upon the selected scrolling speed the computer reloads the display memory from the digital memory to replace the data which has been displayed and scrolled off the monitor. Two successive pixels in the direction of movement are read out of the display memory, a current pixel and a next pixel, and are added together in a mixer with a fractional value parameter determined by the computer according to the scrolling speed to provide a movement corrected pixel for display. The corrected, or weighted, pixel provides a gray scale intensity value which is output from the mixer to a video digital-to-analog (D/A) converter. The output of the D/A converter is a video image suitable for display on the display monitor. The result is to give the appearance of partial pixel movement in the direction of the scrolling irregardless of the scrolling speed selected.

The objects, advantages and novel features of the present invention will be apparent from the following detailed description when read in conjunction with the appended claims and attached drawing.

DESCRIPTION OF THE PREFERRED EMBODIMENT

Figure 1:
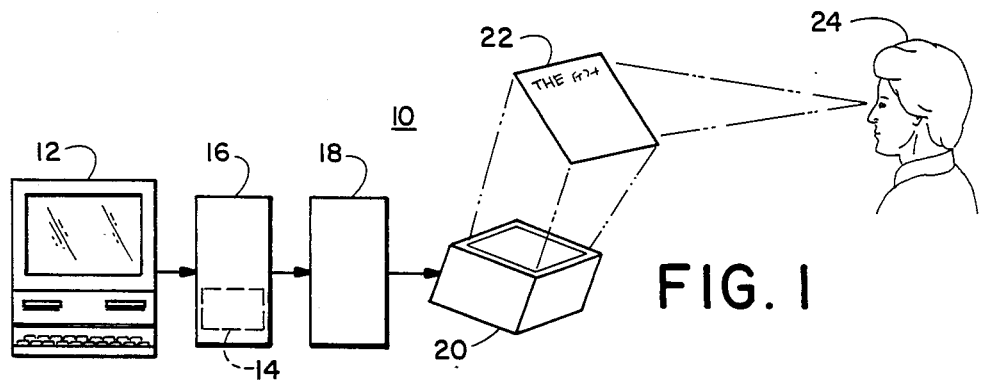
FIG. 1 is a block diagram of a teleprompter system incorporating the digital video generator of the present invention.

Referring now to FIG. 1 a teleprompter system 10 is shown having a word processor 12 upon which text material is drafted and edited. The text material then is off-loaded directly into a digital memory 14 of a general purpose computer, or microprocessor, 16. A digital video generator 18 processes the text material under control of the computer 16 and converts the processed text material into a standard television signal for display on a display monitor 20. The optical image from the monitor is passed to a beam splitter 22 from which the text material may be read by a speaker 24.

Figure 2:
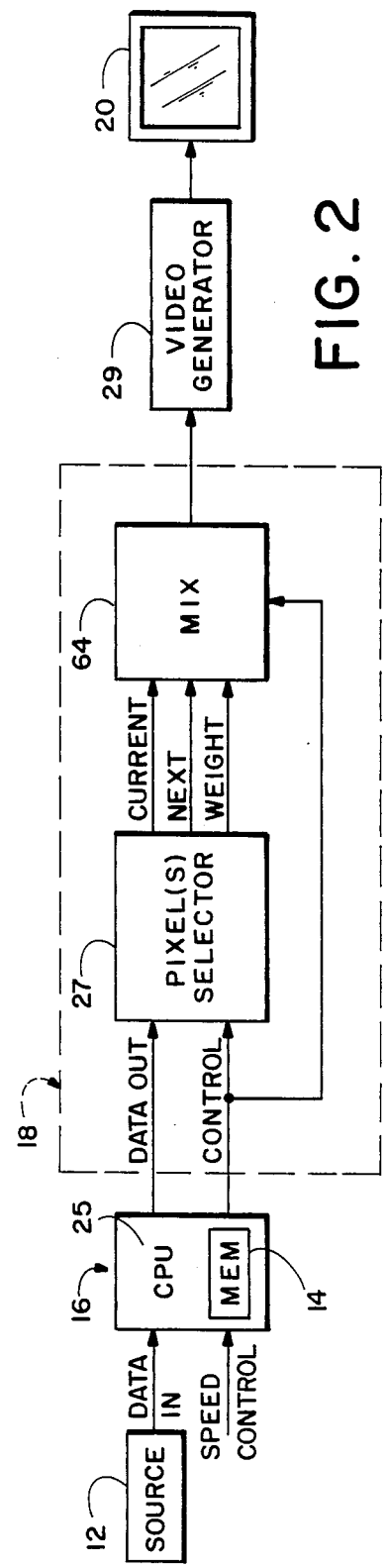
FIG. 2 is a general block diagram of the digital video generator according to the present invention.

The digital video generator 18 is shown generally in FIG. 2. The computer 16 has a central processing unit 25, such as any one of a number of microprocessor units currently available, and the digital memory 14 contains both the digital data for display, in the form of ASCII characters where the data is text material, and the computer program to control the digital video generator. The computer 16 receives input data from the word processor, an animation generator, video tape or other data source 12 and stores the data in the digital memory 14. Data, in the form of data to be displayed and of computed initial values for each display cycle, are output from the computer 16 into a pixel selector 27. The pixel selector 27 selects the current pixel to be displayed and the next pixel in the direction of movement and outputs these pixels in the form of gray scale intensity and/or color shading values to a mixer 64 together with a weighting factor dependent upon the movement, or scroll, rate. The weighted pixel output is then input to a video generator 29 where the weighted pixels are processed for output to the display device 20.

Figure 3A:
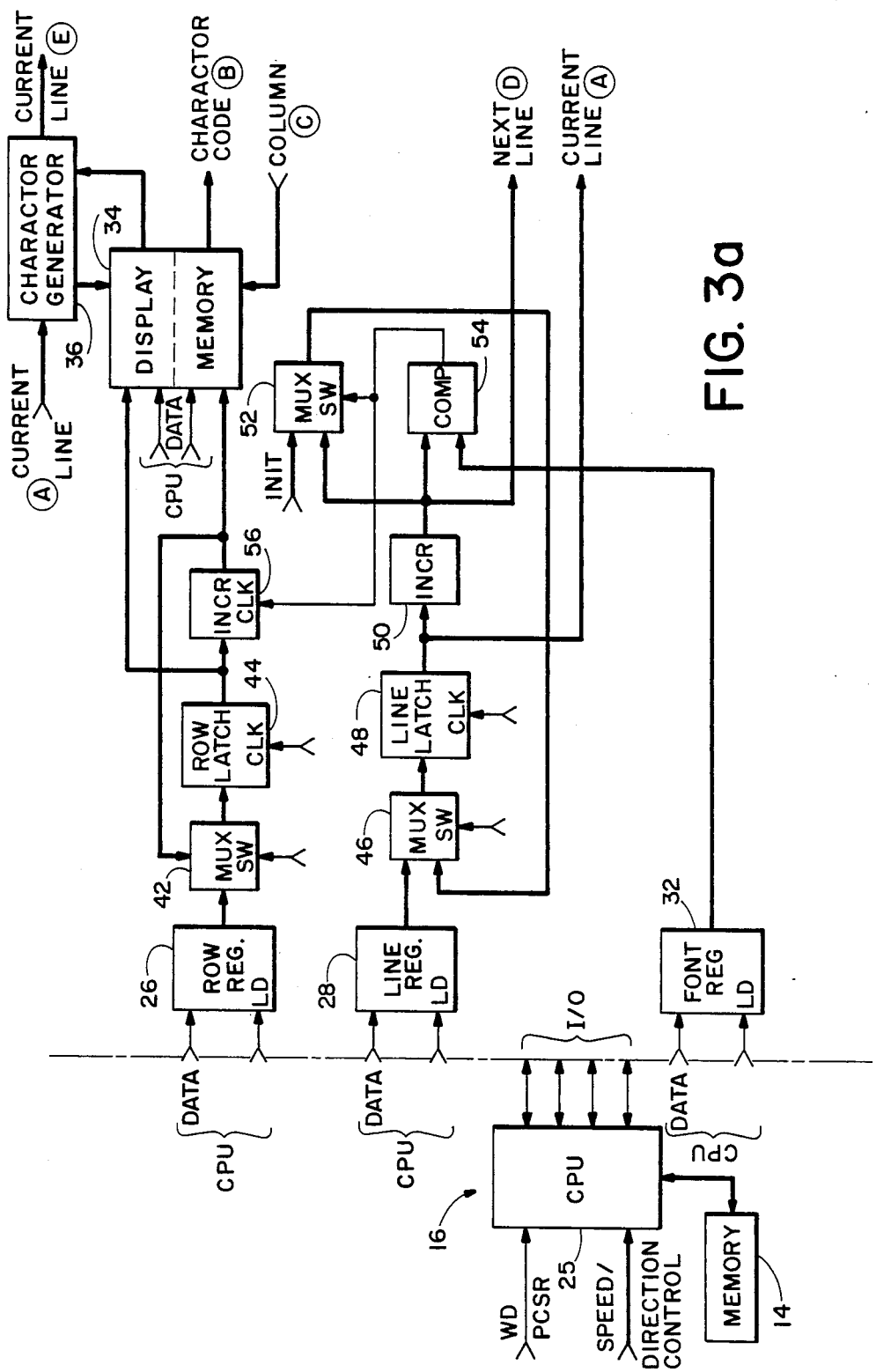
FIGS. 3a and 3b is a block diagram of the digital video generator as implemented in a teleprompter system.
Figure 3B:
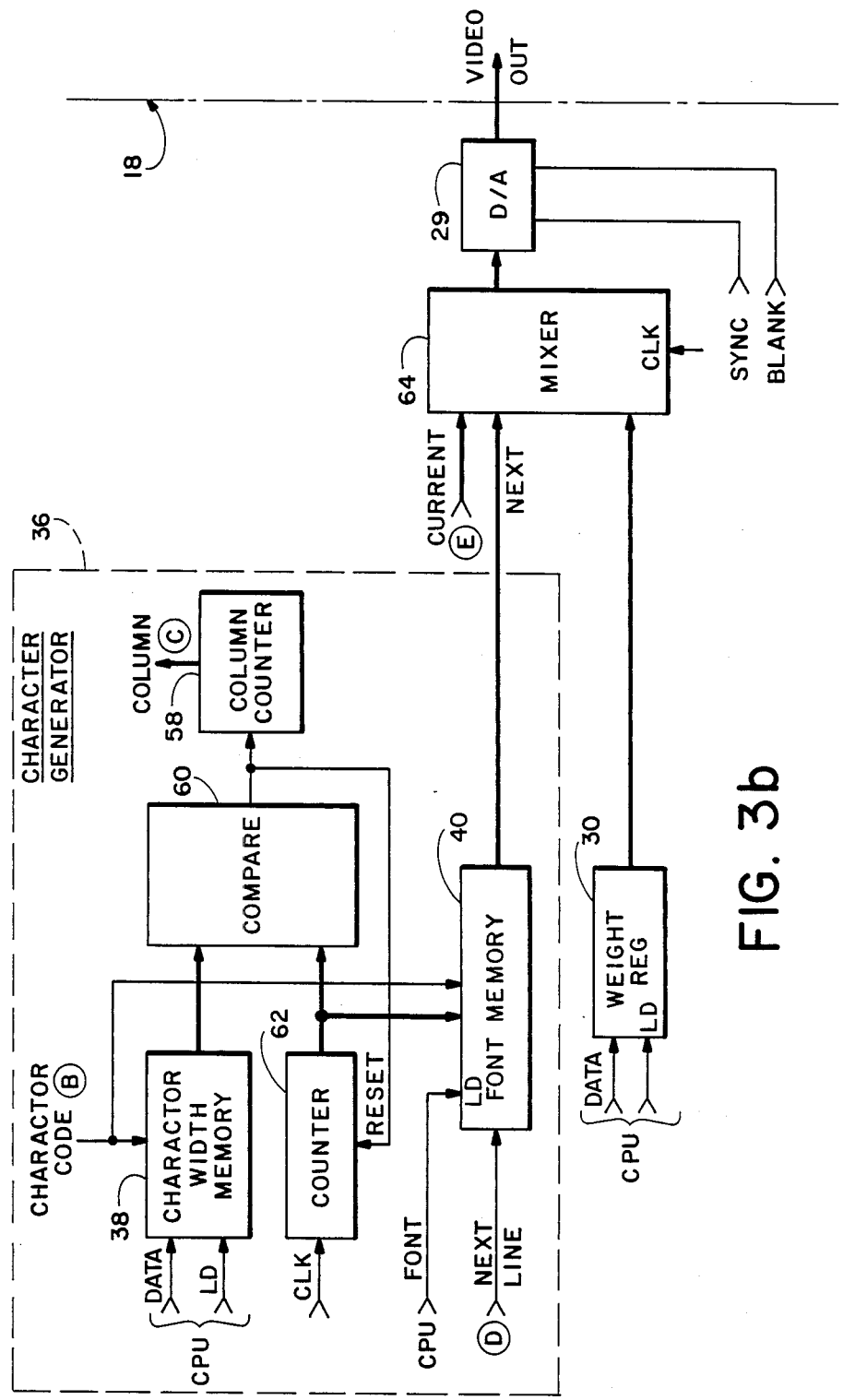

FIGS. 3a and 3b shows in more detail the digital video generator 18 as configured for use in a teleprompter system. At the beginning of each field of a television display the computer 16 loads initial values into a plurality of input registers. For a teleprompter system the input registers include a row register 26 into which is loaded a pointer to indicate the row of text at the top of the field, a line register 28 into which is loaded a pointer to indicate the line within the row of text at the top of the field, and a weight register 30 into which is loaded a weighting factor determined by the current scrolling speed of the video display. Also, at initiation or whenever it is desired to change the font of characters, the computer 16 loads a font height register 32 with a value representing the number of lines per row for the selected font.

Figure 4:
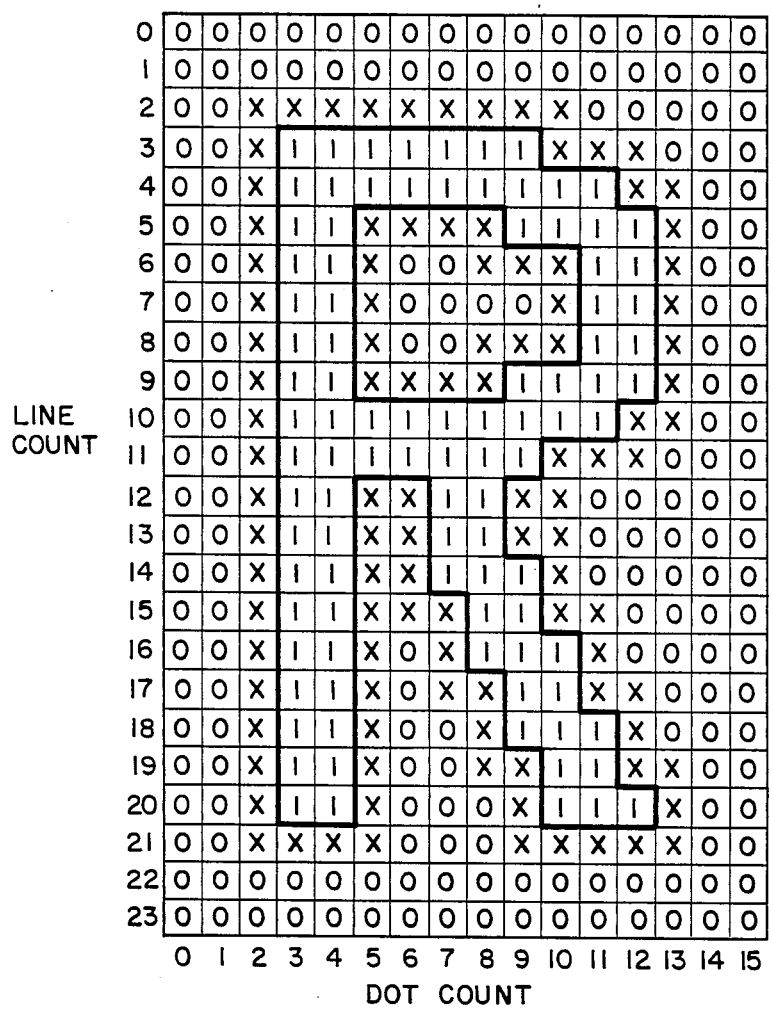
FIG. 4 is a rough representation of a data character from a given font of characters used in a teleprompter system with the digital video generator of the present invention.

The text material from the digital memory 14 is loaded by the computer into a digital memory 34. The display memory 34 is in the form of a wrap-around memory which may be implemented by two identical memories containing identical information. The outputs of the display memory 34 are two character codes which are input into two parallel character generators 36. The character codes are input into respective character width memories 38 to specify the character width for proportional spacing and into font memories 40 to select the appropriate character array in the form of m×n dots, squares or pixels corresponding to that character code. Each dot, square or pixel in the character array, an example of which is shown in FIG. 4, contains intensity information in the form of gray scale levels for that dot to provide spatial anti-aliasing, i.e., a blurring of the edges and corners of the characters when the character is stationary. The character width memories 38 and the font memories 40 are loaded by the computer 16 at initialization and whenever a different font is selected.

The output of the row register 26 is input to a row multiplexer 24 to establish an initial value at the top of the display for each display cycle, or field. The output of the multiplexer 42 is loaded into a row latch 44. Likewise the output of the line register 28 is input to a line multiplexer 46 to establish an initial value at the top of the display for each display cycle, or field. The output of the multiplexer 46 is loaded into a line latch 48. The output of the line latch 48 is incremented by one in an incrementer 50 for each line displayed during a display cycle. The output of the incrementer 50 is input to a second line multiplexer 52 and to a height comparator 54. The output of the second line multiplexer 52 is input to the first line multiplexer 46. The second input to the height comparator 54 is from the font height register 32. When the next line number from the incrementer 50 equals the height value from the font height register 32, the height comparator 54 outputs a signal to the second line multiplexer 52 to output an initial line value to the first line multiplexer 46, and to a row incrementer 56 to add one to the row number. The incremented row number is loaded into the row latch 44 via the row multiplexer 42.

The row number from the row latch 44 indicates the current row and the row number from the row incrementer 56 indicates the next row, and these row numbers are used as addresses into the display memory 34 to select the rows to be processed. The current row and next row will generally be identical except when the current line is the last line of the current row. Within each character generator 36 is a column counter 58 which points to the character within the row that is being processed. The column counters 58 are incremented by the output of respective width comparators 60. The inputs to the width comparators 60 are the character width from the character width memory 38 and the current dot, square or pixel count along the current line being processed output from a dot counter 62. When the dot count equals the character width, the output from the width comparator 60 increments the column counter 58 to select the next character code in the row from the display memory 34 and resets the dot counter 62. The dot counter 62 is incremented for each dot, square or pixel processed within a character along a line. The dot counters 62 also are reset at the beginning of each line.

The character code outputs from the display memory 34 select for display a character from the font memories 40. The line address from the line latch 48 selects the current line of the character from one font memory 40 and the line address from the line incrementer 50 selects the next line of the character from the other font memory. The output of the dot counters 62 select the position along the line within the character array which is to be displayed. The font memories 40 output an intensity level for the corresponding pixels, or group of pixels, on consecutive lines which is input to a combination mixer and gamma corrector 64. The function of a gamma corrector is familiar to those in the television arts and is not a part of this invention, and so will not be described here. A third input to the mixer 64 is the output of the weight register 30 which provides the weighting factor for combining the corresponding pixels on consecutive lines. The weighting is computed by the computer 16 at the beginning of each display cycle, or field, and is a function of the instantaneous scrolling speed which is input to the computer by conventional means under the control of an operator who may be the speaker.

The output of the mixer 64 is a weighted average of the corresponding pixels on consecutive lines with the appropriate gamma correction. This output is input to a conventional television digital-to-analog (D/A) converter, or video generator, 29 which also inserts appropriate sync and blanking pulses to produce a composite video output. This video output is routed to the display monitor and displayed normally. The result of this weighting is to provide an appearance of partial line movement on a field-to-field basis.

At low speeds for the conventional interlaced television display system changes to the initial row, line and weight values produce a noticeable flicker if made for each field. To eliminate this flicker these initial values are changed on a frame-to-frame basis at low scroll speeds instead of on a field-to-field basis. Empirically, the point of changeover occurs roughly at the scroll speed where the image is moving up at about two lines per field, which comes out to be a scroll rate of approximately 3.5 to 4 seconds for the entire image to scroll from the bottom to the top of the display. Also, the character generators 36 are described as parallel processors with independent memories having identical data. However, these memories may in fact be one memory if the access time is fast enough so that the consecutive line values are read out from a single memory without causing real-time delays. Finally, a monochrome system is described in conjunction with a teleprompter system, but this invention is equally applicable to a color system where gray code levels are replaced with color values to produce the necessary shading, or to any digital graphic display in which smooth scrolling of a video display is desired.

Figure 5:
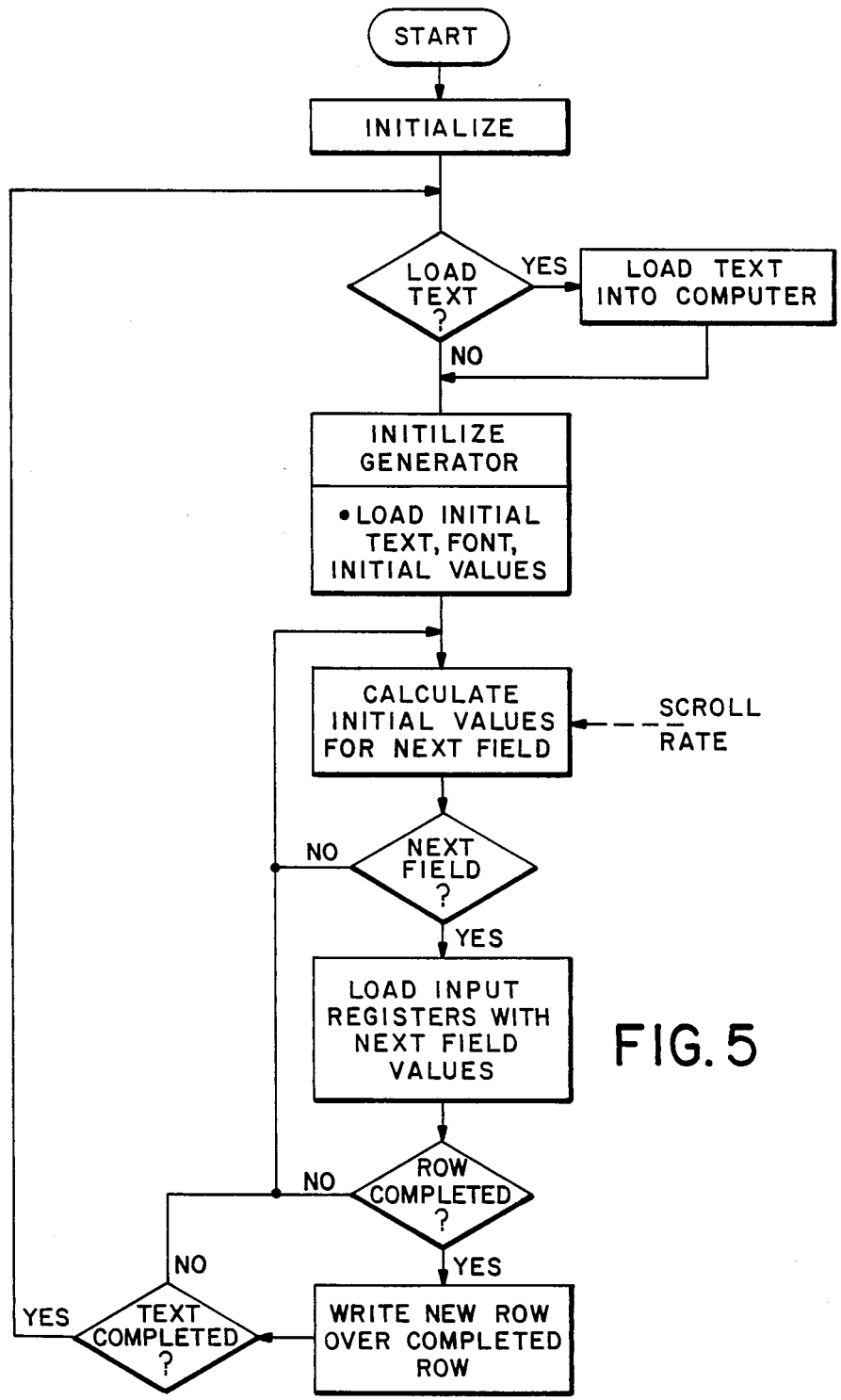
FIG. 5 is a general flowchart of the computer processing for a teleprompter system using the digital video generator of the present invention.

In operation the computer 16 handles the data movement and computation functions while the digital video generator 18 handles the high speed processing within each display cycle. Referring to FIG. 5 the computer 16 initializes and receives text input from an external source, such as the word processor 12, as well as character fonts and loads it into the digital memory 14. The computer 16 also provides initial values for the various input registers of the digital video generator 18. Initial text then is transferred from the digital memory 14 into the display memory 34, which memory is small compared to the digital memory and only contains a few more rows than can be displayed on the display device 20 in any frame. Also the initial row, line and weight values, which are zero initially, are input to the input registers. During operation of the teleprompter system if there is new text to be added, the computer loads the text into the digital memory on an interrupt basis and then, based upon the scroll rate selected, calculates the row, line and weight values for the next field, or display cycle. When top of the field is detected, the input registers of the digital video generator 18 are loaded with new initial values. If a row of text has been scrolled off the display screen of the display device 20, then a new row of text from the digital memory 14 is read into the display memory 34 in place of that text. Since the display memory is a wrap-around memory, this provides continuous text for display. When the last row of text has been scrolled off the screen, the computer terminates the operation until new text data is loaded into the digital memory 14, or the operator scrolls backwards or instructs the teleprompter to go back to the beginning or some other marked point.

During each display cycle the digital video generator 18 prepares one line at a time to output to the D/A converter 29. The initial values from the computer 16 are latched into the respective latches via the respective multiplexers. For a conventional television system the multiplexers are swtiched to receive the initial values for the latches at a vertical sync rate. For the remainder of the display cycle the input to the latches via the multiplexers represents the current row and line being processed. The rate at which the line is incremented is the horizontal sync rate for a conventional television system. The row value selects the row of the display memory from which the character code is taken, the line value selects the line of that row, or character, being processed, and the pixel within the line is selected by the count of the dot counters which are clocked at a multiple of the subcarrier frequency for a conventional television system. The timing pulses are derived from standard television clock generators. Although a conventional television system is referred to, the timing depends upon the vertical and horizontal rates of the display device 20 as well as the pixel resolution for each line. The corresponding pixels on the current line and the next line are combined pixel by pixel with the weight factor for that display cycle and output serially to the D/A converter 29. The D/A converter 29 adds the requisite sync and blanking pulses to produce a conventional composite video signal which can be used by a standard television monitor.

FIG. 4 shows a character "R" as it might appear in the font memories 40. For this example the character array is 24×16. The character is blurred by having gray pixels between the black of the character and the white of the background. The shade of gray varies so that the effect to the human eye is a smooth blurring of the edges of the character. If the character code from the display memory 34 corresponds to "R", then the character width memories 38 will load a value corresponding to the pixel width of sixteen. If the line of the current row being processed is, for example, seven, then lines seven and eight will be read out of the font memories 40 dot by dot for input to the mixer 64, i.e., pixel (7,7) will be combined with pixel (8,7), etc. For half line movement per field on one field the weight for line seven would be one and for line eight would be zero, while for the next field the respective weights would be ½ and ½, and the initial values for row and line would be (x,0) and (x,12), respectively.

A more realistic example is as follows. Suppose that the display starts at row 0, line 0 and weighting factor 0, and that a 10-second roll is desired, i.e., move the image up the 480 visible lines in 10 seconds. This is a slow roll so the pointers will be changed on a frame-to-frame basis as opposed to a field-to-field basis. In 10 seconds there are 300 frames so the image is moving up at a rate of 480 lines in 300 frames, or 1.6 lines per frame. The following table shows the resulting pointer values for the first few frames of this example:

| Frame | Row | Line | Weight |
| --- | --- | --- | --- |
| 1 | 0 | 0 | 0.0 |
| 2 | 0 | 1 | 0.6 |
| 3 | 0 | 3 | 0.2 |
| 4 | 0 | 4 | 0.8 |
| . | . | . | . |
| . | . | . | . |
| . | . | . | . |

Thus, the present invention provides a digital video generator for providing both spatial and temporal anti-aliasing of a video image on a display monitor. The spatial anti-aliasing is provided by a font of characters with blurred edges, i.e., the array for each character has gray scale intensity levels for each dot, square or pixel of the array with a region of varying values between the character itself and the background. The temporal anti-aliasing is provided by weighting consecutive pixels in the direction of movement, i.e., scrolling, with a weight factor to give the appearance of partial pixel movement for each display cycle.

What is claimed is:

1. An improved teleprompter system, of the type having text material scrolling across a video display at an operator controlled varying rate according to the reading rate of an observer, for improving subjective legibility and apparent smoothness of the scrolling, the improvement comprising:

a word processor for composing and editing text material;

means for storing data, the storing means being coupled to the word processor so that the text material is off-loaded directly into the storing means in the form of character codes upon command;

means for cyclically displaying the text material as a video output having a plurality of lines per display cycle; and means for generating the video output from the character codes, the character codes being used to access a selected one of a plurality of fonts having text characters corresponding to each character code, by producing apparent fractional line movement for each display cycle of the text material having characters according to the selected font on the displaying means, the apparent fractional line movement being a function of the varying rate.

2. A digital video display generator for providing temporal anti-aliasing of an object as the object moves across a digital video display comprising:

means for storing a digital representation of the object in the form of pixels;

means for processing the digital representation cyclically for display on the video display device;

means for generating weighting factors for the digital representation as a function of the rate of movement of the object; and means for mixing consecutive pixels of the digital representation in the direction of movement of the object according to the weighting factors to produce apparent partial pixel movement of the object across the digital video display for each display cycle.

3. A digital video display generator for providing temporal anti-aliasing of an object as the object moves across a digital video display comprising:

means for storing a digital representation of the object in the form of pixels;

means for determining a current line of a display cycle for the video display;

means for determining a next line of the display cycle for the video display;

means for generating weighting factors for the digital representation as a function of the rate of movement of the object;

means for mixing consecutive pixels of the digital representation in the direction of movement of the object according to the weighting factors to produce apparent partial pixel movement of the object across the digital video display for each display cycle; and means for temporarily storing a portion of the digital representation, the current and next line determining means accessing the corresponding lines of the digital representation in the temporary storing means for input to the mixing means to produce a current display line that is a combination of the current and next lines according to the weighting factor for the current line.

4. A digital video display generator as recited in claim 3 wherein the current and next line determining means comprise:

a starting line register loaded at the beginning of each display cycle with a starting line value;

a line multiplexer to which the starting line value is input, the output of which is the current line value;

means for incrementing the current line value from the line multiplexer to produce a next line value, which next line value is input to the line multiplexer; and means for switching the output of the line multiplexer between the starting line value at the beginning of each display cycle and the next value for each line of the display cycle subsequent to the starting line value.

5. A digital video display generator as recited in claim 3 wherein the digital representation comprises text material in the form of character codes.

6. A digital video display generator as recited in claim 5 wherein the current and next line determining means comprise:

a starting row register loaded at the beginning of each display cycle with a starting row value of the text material;

a starting line register loaded at the beginning of each display cycle with a starting line value within the starting row;

a font register loaded with a height value for a character font selected from a plurality of character fonts to display the text material;

a row multiplexer to which the starting row value is input and from which a current row value is output;

a line multiplexer to which the starting line value is input and from which a current line value is output;

means for incrementing the current line value for each horizontal line displayed on the video display to produce a next line value, the next line value being input to the line multiplexer;

means for incrementing the row line value when the next line value equals the height value from the font register to produce a next row value which is input to the row multiplexer, resetting the next line value to a first line value of the next row; and means for switching the row and line multiplexers between the starting row and line values at the beginning of each display cycle and the next row and line values for the remainder of the display cycle.

7. A digital video display generator as recited in claim 6 wherein the processing means further comprises a character generator to which is input character codes from the temporary storing means according to the row accessed by the current and next row values and from which is output intensity values for each pixel of the current line and of the next line for input to the mixing means.

8. A digital video display generator as recited in claim 7 wherein the character generator comprises:

a font memory having an array of intensity values for each character of the selected character font from which are output in response to the character codes from the temporary storing means a current line pixel output and a next line pixel output for input to the mixing means, each line pixel output being a plurality of intensity values from the corresponding line of the arrays selected by the character codes; and means for selecting the next character code of a row from the temporary storing means according to the width of the array of the character being processed so that each character of the selected row of text material from the temporary storing means is processed subquentially;

whereby the current line pixel output and next line pixel output corresponding to the current line is input to the mixing means.

9. A digital video display generator as recited in claim 8 wherein the processing means further comprises a fractional line register loaded at the beginning of each display cycle with a fractional line value corresponding to the rate of scrolling of the text material across the video display, the fractional line value being input to the mixing means to provide the weighting factor for mixing the current and next line pixel outputs to produce the current video line for the video display.

10. An improved teleprompter system, of the type having text scrolling across a video display at an operator controlled varying rate corresponding to the reading rate of the text by an observer, for improving the subjective legibility of the text and the apparatus smoothness of the scrolling comprising:

means for storing a digital representation of the text to be displayed;

means for cyclically processing the digital representation to produce video lines of pixels that make up the video display;

means for generating weighting factors for the video lines of pixels as a function of the varying rate; and means for mixing consecutive pixels of the digital representation in the direction of scrolling according to the weighting factors to produce apparent partial pixel movement of the text across the video display for each display cycle.

* * * * *